United States Patent [19]

Vaughan et al.

[11] Patent Number: 5,013,536

[45] Date of Patent: May 7, 1991

[54] ECR-18, METHOD OF ITS PREPARATION, AND USES FOR SORPTION AND SEPARATION

[75] Inventors: David E. W. Vaughan, Flemington; Karl G. Strohmaier, Port Murray, both of N.J.

[73] Assignee: Exxon Research and Engineering Company, Florham Park, N.J.

[21] Appl. No.: 234,649

[22] Filed: Aug. 22, 1988

[51] Int. Cl.⁵ ............................................. C01B 33/28
[52] U.S. Cl. .................................... 423/328; 502/64; 502/77; 502/407

[58] Field of Search ....................... 423/328, 329, 326; 502/60, 62, 64, 77, 407

[56] References Cited

U.S. PATENT DOCUMENTS 4,661,332  4/1987  Vaughan et al. .................... 423/326

Primary Examiner—Jeffrey E. Russel
Assistant Examiner—R. Bruce Breneman
Attorney, Agent, or Firm—Ronald D. Hantman

[57] ABSTRACT

This invention relates to a synthetic zeolite, designated as ECR-18, having a structure similar to the mineral paulingite, a process for preparation of the zeolite, and processes for the use of such products.

14 Claims, 1 Drawing Sheet

TGA

ECR-18, METHOD OF ITS PREPARATION, AND USES FOR SORPTION AND SEPARATION

FIELD OF THE INVENTION

This invention relates to a synthetic zeolite, designated as ECR-18, having a structure similar to the mineral paulingite, a process for its preparation, and various methods of use.

BACKGROUND OF THE INVENTION

Zeolites, both natural and synthetic, have been used in a variety of catalytic and adsorptive operations. Most zeolitic materials are porous ordered aluminosilicates having a definite (although often undetermined) crystal structure. The structure may have a number of small cavities interconnected by a number of still smaller channels. These cavities and channels are uniform in size within a certain zeolitic material. The above-mentioned catalytic and adsorptive processes make use of these cavities and channels since by proper choice of zeolite, the zeolite channels will reject some molecules because of their size and accept others.

These zeolites typically are described as a rigid three-dimensional framework of silica and alumina wherein the silica and alumina tetrahedra are linked through common oxygen atoms. The charge balance of the zeolite may be satisfied by inclusion of a proton, metal, or ammonium cation. The catalytic and adsorptive properties of the zeolite may be varied by changing the ions within the zeolite. Conventional ion exchange techniques may be used to change those cations.

Similarly, there are a large number of both natural and synthetic zeolitic structures. The wide breadth of such numbers may be understood by considering the work *Atlas of Zeolite Structures* by W. M. Meier and D. H. Olson (Butterworths Press (1988)). Many natural zeolites are quite difficult to synthesize using the present state of the art, several of which have not yet been made synthetically. See, Robson, Chem. Tech. (1978), p. 180.

There are a large number of methods for producing zeolitic materials. May of these synthetic methods utilize mixtures of alumina, silica, a base and water, and control the typical zeolite produced by varying the reactant concentrations, temperature and pressure of reaction, and time of reaction. Other methods of controlling the type of zeolite produced include the use of zeolitic seeds as nucleation centers, combinations of solvents, or organic ammonium salts as "templates" in the reaction mixture.

The use of quaternary ammonium salts as templates or reaction modifiers in the preparation of synthetic crystalline aluminosilicates (zeolites), first discovered by R. M. Barrer in 1961, has led to preparation of a number of zeolites which are not found in nature. For example, U.S. Pat. No. 4,086,859 discloses preparation of a crystalline zeolite thought to have the ferrierite-like structure (ZSM-21) using a hydroxyethyl-trimethyl sodium aluminosilicate gel. A review provided by Barrer in *Zeolites*, Vol. I (1981), p. 136, shows the zeolite types which are obtained using various ammonium organic bases as cation. In addition, Breck, *Zeolite Molecular Sieves*, John Wiley (New York, 1974), pp. 348-378, provides a basic review of zeolites obtained using such ammonium cations in the synthesis thereof.

The zeolite of this invention is produced using potassium and/or rubidium and/or barium and organic ammonium ion (tetraethylammonium) and sodium as essential components in the synthesis mixture. It has the general chemical composition:

where $a+b+c=0.9$ to 1.2 and R may be tetraethyl ammonium (TEA) or methyl triethyl ammonium (ME$_3$) ions. However, unlike any other synthetic zeolites previously disclosed (See, H. E. Robson, supra) the inventive zeolite has a structure similar to the mineral paulingite. Paulingite is a very rare mineral which is classified as a member of the faujasite group. The mineral was first reported by Kamb and Oke, Amer. Mineral. 45, p. 79, 1960. The mineral's structure has been reported to be complex and its composition to be:

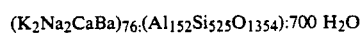

See, Gordon et al, Science 154. p. 1004, 1966. A recent review of paulingite can be found in "Natural Zeolites", by Gottardi & Galli ((1985), Springer-Velag, Berlin).

The synthetic zeolite (ECR-18), is previously reported only in a di-cation form (U.S. Pat. No. 4661332). This process for producing ECR-18 in a necessary tri cationic form has not been previously disclosed. The absence of one of these cations yields non-ECR-18 zeolites such as faujasite, chabazite and L.

SUMMARY OF THE INVENTION

The present invention relates to a zeolite, designated for convenience herein as ECR-18, having a chemical composition which requires the presence of cations in three different sized (radii) groups :0.9 to 1.1 Å (eg Na+); 1.2 to 2.5 Å (eg K+, Rb+, Ba$^{2+}$) and greater than about 4 Å (eg TEA+). Expressed in terms of mole ratios of oxides and ECR-18 will have an exchange cation composition in the range:

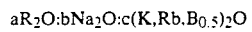

The more preferred composition for the zeolite is in the range:

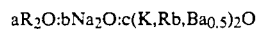

where $a+b+c=0.9$ to 1.2 ratioed to Al$_2$O$_3$ equal to unity
and
$a=0.04$ to 0.20
$b=0.35$ to 0.75
$c=0.10$ to 0.60

These compositions, as produced, may also have up to about 12 moles of water per mole of Al$_2$O$_3$. The zeolite has a very high void volume and consequently is suitable for use as a sorbent having great capacity. Indeed, only the faujasite polymorphs have been reported as having greater void volume then paulingite.

The x-ray diffraction pattern for ECR-18 has the major peaks indicated in Table I below.

The aluminosilicate herein may be used as a sorbent or as a catalyst for hydrocarbon conversion.

In another embodiment of this invention, the novel zeolite may be prepared by a process comprising:

(a) preparing a reaction mixture comprising a mixture of an oxide of sodium, and potassium, rubidium, or barium and a tetraethyl-ammonium (TEA) or methyl triethyl ammonium (ME$_3$) salt, water, a source of silica, a source of alumina, and sodium aluminosilicate nucleating seeds, said reaction mixture having a composition, in terms of mole ratios of oxides, within the following ranges:

| (Na, K, Rb, Ba$_{0.5}$)$_2$O:Al$_2$O$_3$ | 1.8 to 4.0 |
|---|---|
| SiO$_2$:Al$_2$O$_3$ | 4.0 to 16 |
| H$_2$O:Al$_2$O$_3$ | 80 to 240 | and said seeds being present in an amount to yield 0.1 to 10 mole percent of the total final alumina content in said aluminosilicate;

(b) blending the reaction mixture sufficiently to form a substantially homogeneous mixture;

(c) maintaining the reaction mixture at a temperature between about 80° C. and 260° C. under autogenous pressure for a sufficient period of time to form crystals of the aluminosilicate; and (d) recovering the product crystals.

It will be understood that the compositions herein may contain some waters of hydration which may be at least partially removed when the zeolites are employed as sorbents or catalysts.

BRIEF DESCRIPTION OF THE DRAWING

The figure is a thermogram of a composition of the present invention.

DESCRIPTION OF THE PREFERRED EMBODIMENTS

Figure 1:
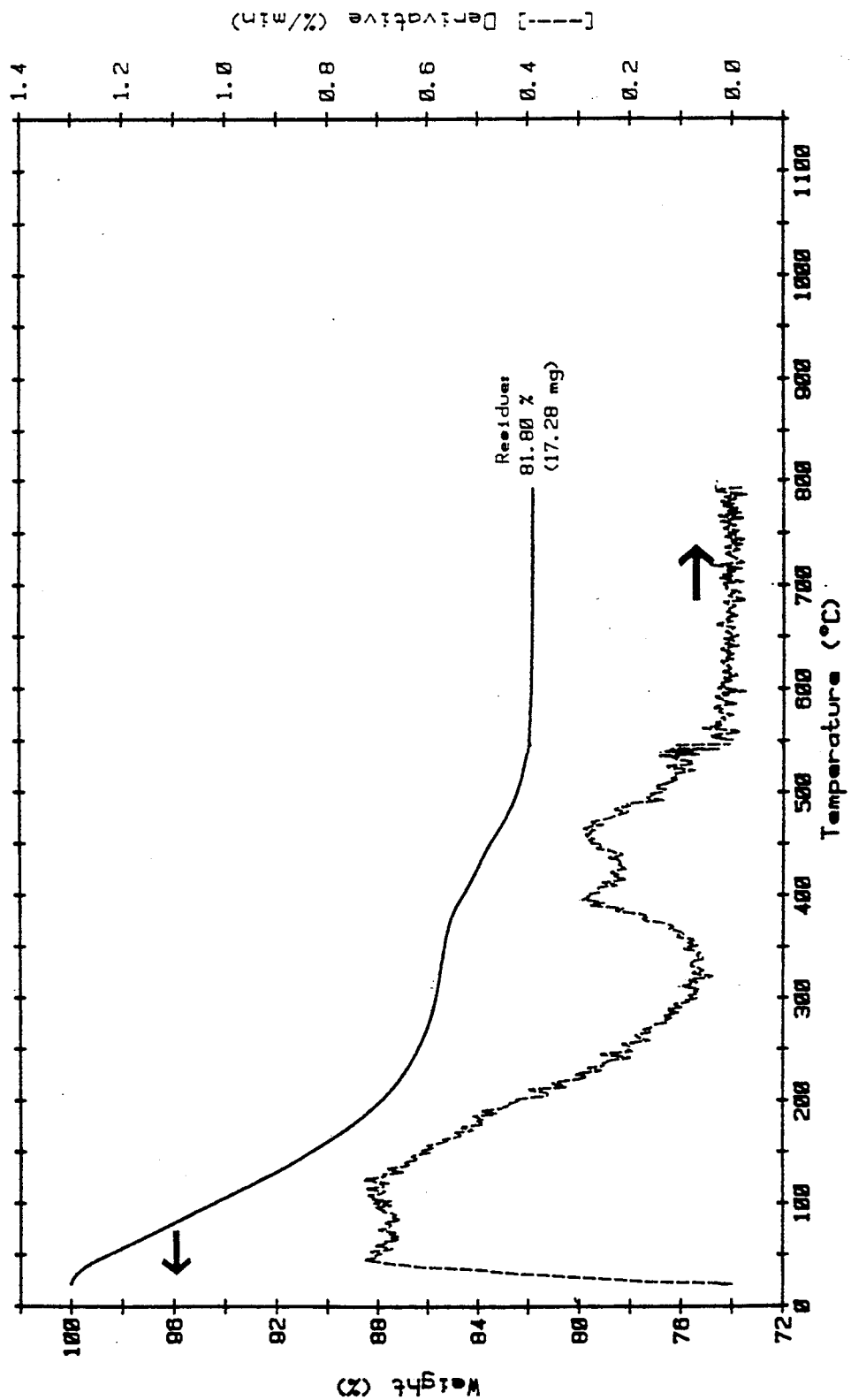

The aluminosilicate herein generally will have the formula, in terms of mole ratios of oxides, in the range:

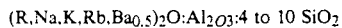

(R,Na,K,Rb,Ba$_{0.5}$)$_2$O:Al$_2$O$_3$:4 to 10 SiO$_2$

The zeolite has a structure similar to or is generally isostructural with the mineral paulingite. It is, however, based on a sodium, and potassium, rubidium or barium and TEA cation system. The material has a significant void pore volume, e.g., greater than about 0.40 cc/cc of zeolite, often as much as 0.47 cc/cc of zeolite. The significant pore value indicates that it has utility as a sorbent with substantial capacity, or as a small pore catalyst.

The x-ray diffraction pattern for ECR-18 has the following major peaks:

TABLE 1

| Essential Peaks In X-Ray Diffraction Pattern Of ECR-18 | | |
|---|---|---|
| 2θ | dÅ | Intensity |
| 10.66± | 8.29 ± 0.3 | vs. |
| 12.83 | 6.90 ± 0.2 | vvs. |
| 14.25 | 6.21 ± 0.2 | m |
| 17.82 | 4.97 ± 0.15 | m |
| 18.55 | 4.78 ± 0.15 | s |
| 20.23 | 4.39 ± 0.15 | m |
| 20.83 | 4.26 ± 0.15 | m |
| 21.75 | 4.08 ± 0.15 | m |
| 24.83 | 3.58 ± 0.10 | vs. |
| 26.62 | 3.35 ± 0.10 | vs. |
| 27.35 | 3.26 ± 0.10 | vvs. |
| 28.52 | 3.12 ± 0.10 | s |
| 28.98 | 3.08 ± 0.10 | vvs. |
| 29.91 | 2.99 ± 0.10 | vs. |
| 31.40 | 2.846 ± 0.10 | m |
| 32.85 | 2.724 ± 0.10 | m |
| 34.23 | 2.617 ± 0.10 | s. |

The pattern may be indexed on the basis of a cubic unit cell having a unit celle dge of about 35 Å± 1 Å.

Minor variations in the mole ratios of the oxides within the ranges given in the chemical formulas above do not substantially alter the structure of the zeolite. In addition, the number of waters or hydration will not be the same for each preparation and will depend mainly on the degree to which the alumino-silicate is dried, and the amount of TEA template. As is shown in FIG. 1 (discussed in more detail below), the organic template decomposes and leaves the zeolite at temperatures about 350° C. to 500° C. when calcined in air. The thermogram further shows that the TEA ion is trapped in at least two non-equivalent sites.

In order to convert the inventive zeolites into sorbents or catalysts, exchangeable cations may partially or fully replace the Na, K, Rb or Ba ions wherever they may be found within the structure. The exchangeable cation may be metals from any one of Groups I through VIII of the Periodic Table or rare earth metals, depending on the end use desired. Preferably, the cations will be mono-, di- and trivalent metal cations, particularly from Groups I, II or III of the Periodic Table, such as barium, calcium, cesium, lithium, magnesium, potassium, strontium, zinc, or the like, or hydrogen, rare earth metals, or ammonium or other alkylammonium ions. The presence of these exchangeable cations will generally not cause a substantial alteration of the basic crystal structure of the aluminosilicate. Particularly preferred are mono- and divalent cations, as they are more easily included in the pores of the zeolite crystal. Any ion exchange technique may be employed such as those discussed, for example, in U.S. Pat. No. 3,216,789.

The aluminosilicate herein may be prepared by a process in which a reaction mixture, generally a gel or slurry, is formed of an oxide of sodium, potassium, rubidium and/or barium, water, a source of silica, a source of alumina, and sodium zeolitic (aluminosilicate) nucleating seeds. The alkylammonium oxides may be hydroxides or halides, e.g., sodium hydroxide, TEA bromide. The silica may be derived from sources such as, e.g., silica gels, silicic acids, aqueous colloidal silica sols as described, for example, in U.S. Pat. No. 2,574,902, reactive amorphous solid silicas such as fume silicas and chemically precipitated silica sols. Potassium or sodium silicate are preferably minimized because they promote the formation of zeolite G. The alumina may be derived from sources such as, e.g., activated alumina, gamma alumina, alumina trihydrate, sodium and potassium aluminates, alum, or the like. It is noted that the alkali oxides may be provided not only directly by adding, e.g., sodium hydroxide to the mixture, but also indirectly from the source of silica (e.g., as in the seed solution) and/or the source of alumina if, for example, sodium silicate and potassium aluminate (prepared by dissolving KOH and Al$_2$O$_3$·3H$_2$O in water) are respectively employed as at least one of the silica and alumina sources. The preferred sources of alumina are sodium aluminate and an aluminum salt selected from the chloride, sulfate and nitrate salts. The particular anion does not seem to influence the quality of the products.

The aluminosilicate nucleating seeds, if used in the reaction mixture, also known as zeolitic nucleation centers, comprise of a slurry of zeolite solids having the following components: SiO$_2$, Al$_2$O$_3$, Na$_2$O and H$_2$O. Generally, the seeds will have an average particle size less than 0.05 microns The composition of the nucleating seeds in the slurry may be in the approximate ranges, in terms of mole ratios of oxides, as follows:

4 To 30 Na$_2$O:1 to 9 Al$_2$O$_3$:3 to 30 SiO$_2$:250 to 2000 H$_2$O

Such slurries of nucleating seeds may be prepared by the process disclosed in U.S. Pat. Nos. 3,433,589; 3,808,326 and 4,178,352, the disclosures of which are incorporated by reference. In general, the preparation procedure involves mixing of sodium silicate, sodium aluminate and water together and aging the resulting slurry at about 0 to 90° C. for about 1 to 500 hours, with lower temperatures requiring a longer period of time. Preferably, the slurry is aged at about 15 to 40° C. for about 10 to 400 hours and the zeolite centers have compositions in the range:

10 to 16 Na$_2$O:1 to 9 Al$_2$O$_3$:10 to 15 SiO$_2$:250 to 2000 H$_2$O

When used, the amount of nucleating seeds present in the reaction mixture is expressed in terms of the percentage of the total molar alumina content in the aluminosilicate product which is ultimately recovered on crystallization. Thus, for example, if 5 molar percent of the nucleating seeds is added to the mixture, the seeds are contributing 5% of the total molar amount of alumina in the zeolite product recovered. In general, the seeds are present in an amount to yield 0.1 to 20 mole percent of the total final alumina content of the product, and preferably 0.1 to 5 mole percent.

Slurries comprising recycled products of the process disclosed herein may also serve as nucleation seeds.

The relative amounts of ingredients in the reaction mixture will be such that the mixture has a composition, in terms of mole ratios of oxides, within the following ranges:

| Oxide Constituents | Usual Ranges Of Mole Ratios | Preferred Ranges Of Mole Ratios |
|---|---|---|
| (Na,K,Rb,Ba$_{0.5}$)$_2$O:Al$_2$O$_3$ | 0.3 to 3.0 | 0.3 to 1.8 |
| R$_2$O:Al$_2$O$_3$ | 0.8 to 3.5 | 1 to 2.5 |
| SiO$_2$:Al$_2$O$_3$ | 4 to 16 | 5 to 12 |
| H$_2$O:Al$_2$O$_3$ | 80 to 240 | 100 to 200 |

The order of mixing the ingredients is not essential, and all ingredients may be added simultaneously. In one preferred method of preparation a silicate solution, a slurry of nucleating seeds and an organic alkyl ammonium (R) salt solution are added to a blender, followed by slow addition, with mixing, of an alkali aluminate solution and an alum solution. Additional water is added to the resulting slurry. The reaction mixture is ordinarily prepared in a container made of glass, teflon, or metal or the like which should be closed to prevent water loss. When the process is practiced without using seeds, the same sequence is used except that the initial formulated gel is cold aged for at least one day.

After the reaction mixture is formed it may be homogenized by thorough blending so as to be substantially homogeneous in texture. This step is to ensure that the aluminosilicate product ultimately obtained is not a mixture of products and thus impure.

The homogenized mixture is then placed in a reactor, ordinarily one which can withstand elevated pressures such as a tetrafluoroethylene-lined jar or a steel autoclave, where it is maintained at a temperature of between about 80° C. and 260° C., preferably 80° C. and 200° C., and, for commercial purposes, preferably no greater than 180° C. When the homogenized mixture is heated it is maintained at autogeneous pressures which will depend on the temperature employed. Lower pressures of 1 atm may be adequate for temperatures at the lower range but at higher temperatures up to 260° C. pressures of up to about 80 atm or higher may be achieved. The amount of time required for heating will depend mainly on the temperature employed, so that at 100° C. the heating may be carried out, e.g., for up to 15 days or more, whereas at 150° C. or more the time period may be, e.g., 5 days. In any event, the heating is carried out until crystals are formed of the aluminosilicate zeolite product, i.e., ECR-18.

The crystallization time may be shortened by seeding the slurry before or after the blending step with minor amounts of zeolite ECR-18 crystals of this invention which are preferably chopped at lower temperatures and size range less than about 0.05 um before that seeding.

When the aluminosilicate crystals have been obtained in sufficient amount, they are recovered by centrifugation or filtration from the reaction mixture and are then washed, preferably with deionized water, to separate them from the mother liquor. The washing should continue, for best purity results, until the wash water, equilibrated with the product, has a pH of between about 9 and 12. After the washing step the zeolite crystals may be dried, and then calcined in an oxygen-containing atmosphere to remove the organic ions. Once the large organic ions are removed, the structure is accessible to larger molecules, and is useful as a catalyst or sorbent.

EXAMPLES

The examples which follow illustrate the invention. In all examples, parts and percentages are given by weight and temperatures in degrees Centigrade unless otherwise noted.

EXAMPLE 1

A reaction mixture having the following oxide ratios:

0.50 K$_2$O: 1.3 (TEA)$_2$O: 0.6 Na$_2$O: Al$_2$O$_3$: 9 SiO$_2$: 135 H$_2$O was made by first dissolving 4.57 g. aluminum oxide trihydate in a solution containing 2.28 g. KOH·1/2H$_2$O, 2.16 g. NaOH and 6 ml. H$_2$O. In a plastic beaker were mixed 45.9 g. Ludox HS-40 silica (duPont Co.), 4.53 g. of a "seed" solution (13.33 Na$_2$O: Al$_2$O$_3$: 12.5 SiO$_2$:267 H$_2$O, see U.S. Pat. Nos. 3,574,538 and 4,340,573), 33.4 g. of a 40% aqueous solution of tetraethylammonium hydroxide (RSA Corp., reagent grade), sodium-potassium aluminate solution, and 3.20 g. Al$_2$(SO$_4$)$_3$·17H$_2$O in 6 ml. H$_2$O. The total weight of the mixture was adjusted to 125 g. by addition of H$_2$O, and then thoroughly homogenized in a blender. It was placed in a 125 ml. teflon bottle and reacted at 100° C. for 22 days. The product was filtered, washed with distilled H$_2$O, and dried in an 115° C. oven. The x-ray powder diffraction pattern is given in Table 3, and shows the product to be crystalline ECR-18. Elemental analysis by ICP-AES and AA gave: 8.67% Al; 27.8% Si; 5.59% K; 3.89% Na. Thermogravimetric analysis showed a 3.63% weight loss at 418° C. and 475° C. indicating a product stoichiometry of:

0.09 (TEA)$_2$O: 0.53 Na$_2$O: 0.44 K$_2$O: Al$_2$O$_3$: 6.16 SiO$_2$

EXAMPLE 2

A reaction mixture having the following oxide ratios:

0.40 K$_2$O: 1.4 (TEA)$_2$O: 0.6 Na$_2$O: Al$_2$O$_3$: 9 SiO$_2$: 135 H$_2$O was made by first dissolving 4.77 g. aluminum oxide trihydate in a solution containing 1.95 g. KOH·1/2H$_2$O, 2.52 g. NaOH and 6 ml. H$_2$O. In a plastic beaker were mixed 49.2 g. Ludox HS-40 silica (duPont Co.), 4.86 g. of a "seed" solution (13.33 Na$_2$O: Al$_2$O$_3$: 12.5 SiO$_2$: 267 H$_2$O, see U.S. Pat. Nos. 3,574,538 and 4,340,573), 38.6 g. of a 40% aqueous solution of tetraethylammonium hydroxide (RSA Corp., reagent grade), sodium-potassium aluminate solution, and 3.97 g. Al$_2$(SO$_4$)$_3$·17H$_2$O in 6 ml. H$_2$O. The total weight of the mixture was adjusted to 135 g. by addition of H$_2$O, and then thoroughly homogenized in a blender. It was placed in a 125 ml. teflon bottle and reacted at 100° C. for 20 days. The product was filtered, washed with distilled H$_2$O, and dried in an 115° C. oven. The x-ray powder diffraction pattern is similar to that in Table 1, and shows the product to be crystalline ECR-18. Elemental analysis by ICP-AES and AA gave: 7.95% Al; 26.5% Si; 3.86% K; 3.56% Na. Thermogravimetric analysis showed a 4.6% weight loss at 412° C. and 470° C. indicating a product stoichiometry of:

0.12 (TEA)$_2$O: 0.53 Na$_2$O: 0.33 K$_2$O: Al$_2$O$_3$: 6.40 SiO$_2$

EXAMPLE 3

A reaction mixture having the following oxide ratios:

0.30 Rb$_2$O: 1.5 (TEA)$_2$O: 0.6 Na$_2$O: Al$_2$O$_3$: 9 SiO$_2$: 135 H$_2$O was made by first dissolving 4.57 g. aluminum oxide trihydate in a solution containing 4.53 g. of 50% aq. RbOH, 2.68 g. NaOH and 5 ml. H$_2$O. In a plastic beaker were mixed 48.5 g. Ludox HS-40 silica (duPont Co.), 4.79 g. of a "seed" solution (13.33 Na$_2$O: Al$_2$O$_3$: 12.5 SiO$_2$: 267 H$_2$O, see U.S. Pat. Nos. 3,574,538 and 4,340,573), 40.7 g. of a 40% aqueous solution of tetraethylammonium hydroxide (RSA Corp., reagent grade), the sodium-rubidium aluminate solution, and 4.44 g. Al$_2$(SO$_4$)$_3$·17H$_2$O in 5 ml. H$_2$O, The total weight of the mixture was adjusted to 135 g. by addition of H$_2$O and then thoroughly homogenized in a blender. It was placed in a 125 ml. teflon bottle and reacted at 100° C. for 13 days. The product was filtered, washed with distilled H$_2$O, and dried in an 115° C. oven. The x-ray powder diffraction pattern is given in Table 4, and shows the product to be crystalline ECR-18. Elemental analysis by ICP-AES and AA gave: 7.45% Al; 25.4% Si; 7.06% Rb; 3.86% Na. Thermogravimetric analysis showed a 4.2% weight loss at 408° C. and 464° C. indicating a product stoichiometry of:

0.12 (TEA)$_2$O: 0.61 Na$_2$O: 0.30 Rb$_2$O: Al$_2$O$_3$: 6.56 SiO$_2$

EXAMPLE 4

A reaction mixture having the following oxide ratios:

0.50 Rb$_2$O: 1.3 (TEA)$_2$O: 0.6 Na$_2$O: Al$_2$O$_3$: 9 SiO$_2$: 135 H$_2$O was made by first dissolving 4.87 g. aluminum oxide trihydate in a solution containing 7.63 g. of 50% aq. RbOH, 2.30 g. NaOH and 5 ml. H$_2$O. In a plastic beaker were mixed 49.0 g. Ludox HS-40 silica (duPont Co.), 4.83 g. of a "seed" solution (13.33 Na$_2$O: Al$_2$O$_3$: 12.5 SiO$_2$: 267 H$_2$O, see U.S. Pat. Nos. 3,574,538 and 4,340,573), 35.7 g. of a 40% aqueous solution of tetraethylammonium hydroxide (RSA Corp., reagent grade), sodium-rubidium aluminate solution, and 3.43 g. Al$_2$(SO$_4$)$_3$·17H$_2$O in 5 ml. H$_2$O. The total weight of the mixture was adjusted to 135 g. by addition of H$_2$O, and then thoroughly homogenized in a blender. It was placed in a 125 ml. teflon bottle and reacted at 100° C. for 13 days. The product was filtered, washed with distilled H$_2$O, and dried in an 115° C. oven. The x-ray powder diffraction pattern is similar to that in Table 4, and shows the product to be crystalline ECR-18. Elemental analysis by ICP-AES and AA gave: 7.35% Al; 25.6% Si; 11.4% Rb; 3.01% Na. Thermogravimetric analysis showed a 3.24% weight loss at 480.C indicating a product stoichiometry of:

0.09 (TEA)$_2$O: 0.48 Na$_2$O: 0.49 Rb$_2$O: Al$_2$O$_3$: 6.70 SiO$_2$

EXAMPLE 5

A reaction mixture having the following ratios:

0.50 K$_2$O: 1.3 (Et$_3$MeN)$_2$O: 0.6 Na$_2$O: Al$_2$O$_3$: 9 SiO$_2$: 135 H$_2$O was made by first dissolving 18.0 g. aluminum oxide trihydate in a solution containing 8.98 g. KOH·1/2H$_2$O, 8.51 g. NaOH and 17.5 ml. H$_2$O. In a plastic beaker were mixed 50.1 g. Ludox HS-40 silica (duPont Co.), 4.95 g. of a "seed" solution (13.33 Na$_2$O: Al$_2$O$_3$: 12.5 SiO$_2$: 267 H$_2$O, see U.S. Pat. Nos. 3,574,538 and 4,340,573), 33.0 g. of a 40% aqueous solution of methyltriethylammonium hydroxide (Et$_3$MeN), 14.7 g. sodium-potassium aluminate solution, and 3.50 g. Al$_2$(SO$_4$)$_3$·17H$_2$O in 5 ml. H$_2$O. The total weight of the mixture was adjusted to 135 g. by addition of H$_2$O, and then thoroughly homogenized in a blender. It was placed in a 125 ml. teflon bottle and reacted at 100° C. for 20 days. The product was filtered, washed with distilled H$_2$O, and dried in an 115° C. oven. X-ray powder diffraction analysis showed the crystalline phase to be ECR-18 with minor offretite impurity. Elemental analysis by ICP-AES and AA gave: 8.08% Al; 26.4% Si; 4.82% K; 3.51% Na. Thermogravimetric analysis showed a 4.03% weight loss at 455.C and 487° C. indicating a product stoichiometry of:

0.12 (Et$_3$MEN)$_2$O: 0.51 Na$_2$O: 0.41 K$_2$O: Al$_2$O$_3$: 6.30 SiO$_2$

EXAMPLE 6

A reaction mixture having the following oxide ratios:

0.50 BaO: 1.3 (TEA)$_2$O: 0.6 Na$_2$O: Al$_2$O$_3$: 9 SiO$_2$: 139 H$_2$O was made by first dissolving 20.0 g. sodium aluminate (1.14 Na$_2$O: Al$_2$O$_3$·4H$_2$O) in 39.7 ml. H$_2$O. In a plastic beaker were mixed 48.8 g. Ludox HS-40 silica (duPont Co.), 4.82 g. of a "seed" solution (13.33 Na$_2$O: Al$_2$O$_3$: 12.5 SiO$_2$: 267 H$_2$O, see U.S. Pat. Nos. 3,574,538 and 4,340,573), 35.5 g. of a 40% aqueous solution of tetraethylammonium hydroxide (TEA), 21.4 g. of sodium aluminate solution, 5.86 g. Ba(OH)$_2$·8H$_2$O in 8 mls. H$_2$O, and 3.11 g. AlCl$_3$·6H$_2$O in 3 ml. H$_2$O. The total weight of the mixture was adjusted to 137 g. by addition of H$_2$O, and then thoroughly homogenized in a blender. It was placed in a 125 ml. teflon bottle and reacted at 100° C. for 15 days. The product was filtered, washed with distilled H$_2$O, and dried in an 115° C. oven. X-ray powder diffraction analysis showed the crystalline phase to be ECR-18 contaminated with some faujasite.

EXAMPLE 7

A reaction mixture having the following oxide ratios:

(TEA)$_2$O: 0.11 K$_2$O: Na$_2$O: Al$_2$O$_3$: 7.5 SiO$_2$: 110 H$_2$O was made by first dissolving 26.7 g. sodium aluminate (1.14 Na$_2$O: Al$_2$O$_3$·4H$_2$O) in 50 mls. H$_2$O. In a blender were mixed 132.3 g. Ludox HS-40 silica (duPont Co.), 11.7 g. of a "seed" solution (13.33 Na$_2$O: Al$_2$O$_3$: 12.5 SiO$_2$: 267 H$_2$O, see U.S. Pat. Nos. 3,574,538 and 4,340,573), 88.7 g. of a 40% aqueous solution of tetraethylammonium hydroxide (Fluka Chemical Co. tech. grade containing 1.18% K), sodium aluminate solution, and 6.09 g. Al$_2$(SO$_4$)$_3$·17 H$_2$O in 10 ml. H$_2$O. The total weight of the mixture was adjusted to 350 g. by addition of H$_2$O, and then thoroughly homogenized. It was placed in a 500 ml. teflon bottle and reacted at 100° C. for 6 days. The product was filtered, washed with distilled H$_2$O, and dried in an 115° C. oven. X-ray powder diffraction analysis showed the crystalline phase to be ECR-18 and some chabazite (Barrer G.) impurity.

EXAMPLE 8

A reaction mixture having the following oxide ratios:

(0.5 K$_2$O): 2.4 (TEA)$_2$O: 0.8 Na$_2$O: Al$_2$O$_3$: 12 SiO$_2$: 180 H$_2$O was made by first dissolving 14.9 g. sodium aluminate (1.14 Na$_2$O: Al$_2$O$_3$·H$_2$O) in 30 ml. H$_2$O. In a plastic beaker were mixed 127.7 g. Ludox HS-40 silica (duPont Co.), 9.39 g. of a "seed" solution (13.33 Na$_2$O: Al$_2$O$_3$: 12.5 SiO$_2$: 267 H$_2$O, see U.S. Pat. Nos. 3,574,538 and 4,340,573), 127.8 g. of a 40% aqueous solution of tetraethylammonium hydroxide (Fluka Chemical Co. tech. grade containing potassium impurity estimated at about 2.3%), sodium aluminate solution, and 6.61 g. Al$_2$(SO$_4$)$_3$·17H$_2$O in 10 ml. H$_2$O. The total weight of the mixture was adjusted to 135 g. by addition of H$_2$O, and then thoroughly homogenized in a blender. It was placed in a 500 ml. teflon bottle and reacted at 100° C. for 29 days. The product was filtered, washed with distilled H$_2$O, and dried in an 115° C. oven. The x-ray powder diffraction pattern is similar to that in Table 1, and shows the product to be crystalline ECR-18. Elemental analysis by ICP-AES and AA gave: 7.52% Al; 28.2% Si; 4.97% K; 3.05% Na. Thermogravimetric analysis showed a 5.03% organic weight loss indicating a product stoichiometry of:

0.14 (TEA)$_2$O: 0.48 Na$_2$O: 0.46 K$_2$O: Al$_2$O$_3$: 7.20 SiO$_2$

EXAMPLE 9

A reaction mixture having the following oxide ratios:

0.16 K$_2$O: 1.45 (TEA)$_2$O: 1.58 Na$_2$O: Al$_2$O$_3$: 11.4 SiO$_2$: 170 H$_2$O was made by blending together 23.4 g. of a fluid cracking catalyst gel containing 12.5% Al$_2$O$_3$ and 87.5% SiO$_2$, 3.65 g. NaOH, 30.2 g. of a 40% aqueous solution of tetraethylammonium hydroxide (Fluka Chemical Co. tech. grade containing 1.18% K), and 67.7 g. H$_2$O. It was placed in a 125 ml. teflon bottle and allowed to cold age at room temperature for 3 days. The bottle was placed in an 100° C. oven for 22 days. The product was filtered, washed with distilled H$_2$O, and dried in an 115° C. oven. The x-ray powder diffraction pattern is similar to that in Table 1, and shows the product to be crystalline ECR-18. Elemental analysis by ICP-AES and AA gave: 8.12% Al; 28.1% Si; 1.94% K; 4.52% Na. Thermogravimetric analysis showed a 5.25% organic weight loss indicating a product stoichiometry of 0.13 (TEA)$_2$O: 0.65 Na$_2$O: 0.17 K$_2$O: Al$_2$O$_3$: 6.64 SiO$_2$

EXAMPLE 10

A reaction mixture having the following oxide composition:

1.8 (TEA)$_2$O: 0.6 Na$_2$O: 0.2 K$_2$O: Al$_2$O$_3$: 9 SiO$_2$: 135 H$_2$O was made by first dissolving 18.8 gm sodium aluminate (Fischer Scientific Co.) in 40 gm H$_2$O, and 10.8 gm aluminum sulfate in 15 gm H$_2$O. To a 1.25 liter blender were added 125.8 gm Ludox HS-40, 126 gm aqueous TEAOH (40% wt.) containing 2.4 gm KOH (Fluka Chemicals) and 9.25 gm seeds, and thoroughly mixed. The aluminate and sulfate solutions were then slowly added with continuous mixing. The total weight of slurry was then increased to 350 gm by addition of water. Part of this mixture was reacted for five days at 150° C., after which time it comprised ECR-18 contaminated with a small amount of chabazite. ICP-AES analysis gave an Si/Al ratio of 3.1 and an Na/Al analysis of 0.58. A thermogram of this product is shown in the Figure, indicating TEA trapped in two different sites in the paulingite structure.

EXAMPLE 11

The product of Example 10 was calcined at 550° C. for 4 hours in air to remove the trapped template, then placed in a Cahn sorption balance. After outgassing at 400° C. for 3 hours the sample was exposed to dry CO$_2$ gas at a pressure of 50 torr and 243° K, showing a sorption capacity of 12 wt%, and with n-hexane at 292° K a capacity of 1.8 wt%. The said ECR-18 may therefore be viewed as being able to remove small molecules from hydrocarbon streams, such as CO$_2$ from methane, and water from a wide variety of petrochemical streams. The high Si/Al ratio of this small pore sorbent compared to such zeolites as A and chabazite, makes it particularly useful for the removal of acidic impurities, such as $H_2S$ and COS, from sour natural gas, and $H_2S$ from recycle hydrogen gas streams in refineries.

EXAMPLE 12

Using an input stoichiometry of 2.4 $(TEA)_2O$: 0.8 $Na_2O$: 0.27 $K_2O$: $Al_2O_3$: 12 $SiO_2$: 180 $H_2O$ and the general method of Example 10, an ECR-18 material having a stoichiometry (by ICP-AES) of:

0.14 $(TEA)_2O$: 0.48 $Na_2O$: 0.45 $K_2O$: $Al_2O_3$: 7.2 $SiO_2$ 2.2 gm of the sample was placed in an air furnace and the temperature raised from 150° C. to 550° C. over a 4 hour period. It was then given two successive exchanges with $NH_4Cl$ solutions at 60° C. for 1 hour. These were followed by a framework $Si^{4+}$ exchange treatment with $(NH_4)_2SiF_6$ using the method of Breck and Skeels (Proc. 6th Intl. Zeolite Conf., Ed. Olson and Bisio (1983), p. 87-96, Butterworths Press). The final product had an excellent x-ray diffraction pattern characteristic of ECR-18, indexed with a cubic unit all value of 34.96 Å. Chemical analysis gave an Si/Al ratio of 4.42. After equilibration with water saturated air at 35% relative humidity, the sample water was desorbed on a thermogravimetric analyzer; the sample lost 20.2 wt% sorbed water. The high Si/Al ratio of this small pore material, and its high water sorption capacity makes it an excellent sorbent for the drying and purification of acidic hydrocarbon streams; examples of which are sour natural gas and oil refinery reformer recycle hydrogen gas streams.

TABLE 2

| Indexing | | | ECR-18 | | | Paulingite | |
|---|---|---|---|---|---|---|---|
| h | k | l | 2θ | dÅ | I/Io | dÅ | I/Io |
| 1 | 1 | 0 | 3.51 | 25.1 | 4 | | |
| 2 | 2 | 0 | 7.08 | 12.5 | 9 | 12.37 | 10 |
| 3 | 2 | 1 | 9.39 | 9.41 | 15 | 9.45 | 10 |
| 3 | 3 | 0 | 10.66 | 8.29 | 80 | 8.29 | 100 |
| 4 | 2 | 0 | | | | 7.86 | 10 |
| 4 | 2 | 2 | 12.14 | 7.13 | 11 | 7.14 | 20 |
| 4 | 3 | 1 | 12.83 | 6.90 | 93 | 6.88 | 100 |
| 4 | 4 | 0 | 14.25 | 6.21 | 44 | 6.21 | 40 |
| 4 | 4 | 2 | 15.12 | 5.85 | 22 | 5.86 | 50 |
| 6 | 1 | 1 | 15.53 | 5.70 | 23 | 5.70 | 50 |
| 5 | 4 | 1 | 16.33 | 5.42 | 16 | 5.42 | 30 |
| 5 | 5 | 0 | 17.82 | 4.97 | 40 | 4.96 | 50 |
| 5 | 5 | 2 | 18.55 | 4.78 | 62 | 4.78 | 90 |
| 6 | 4 | 2 | 18.89 | 4.69 | 12 | 4.68 | 30 |
| 7 | 3 | 0 | 19.24 | 4.61 | 3 | | |
| 8 | 0 | 0 | 20.23 | 4.39 | 31 | 4.385 | 40 |
| 6 | 4 | 4 | 20.83 | 4.26 | 30 | 4.25 | 40 |
| 7 | 4 | 3 | 21.75 | 4.08 | 31 | 4.08 | 40 |
| 7 | 5 | 2 | 22.34 | 3.977 | 12 | | |
| 8 | 3 | 3 | 22.92 | 3.876 | 24 | 3.875 | 40 |
| 7 | 5 | 4 | 24.05 | 3.698 | 8 | 3.694 | 20 |
| 8 | 4 | 4 | 24.83 | 3.582 | 73 | 3.582 | 80 |
| 8 | 6 | 2 | 25.94 | 3.432 | 12 | 3.440 | 10 |
| 7 | 6 | 5 | 26.62 | 3.346 | 77 | 3.346 | 80 |
| 8 | 6 | 4 | 27.35 | 3.258 | 100 | 3.261 | 90 |
| 9 | 5 | 4 | 28.06 | 3.178 | 25 | 3.176 | 20 |
| 9 | 6 | 3 | 28.83 | 3.126 | 54 | 3.129 | 70 |
| 9 | 7 | 0 | 28.98 | 3.078 | 98 | 3.078 | 90 |
| 8 | 7 | 5 | 29.91 | 2.985 | 74 | 2.983 | 80 |
| 9 | 8 | 1 | 30.70 | 2.910 | 13 | | |
| 10 | 6 | 4 | 31.40 | 2.846 | 29 | 2.851 | 20 |
| 11 | 6 | 1 | 32.01 | 2.794 | 10 | 2.789 | 20 |
| 9 | 7 | 6 | 32.85 | 2.724 | 36 | 2.725 | 60 |
| 12 | 6 | 0 | 34.23 | 2.617 | 67 | 2.615 | 70 |
| 11 | 8 | 1 | 34.82 | 2.575 | 22 | 2.574 | 10 |
| 9 | 8 | 7 | 35.62 | 2.518 | 11 | 2.520 | 20 |
| 12 | 6 | 4 | 35.71 | 2.512 | 3 | | |
| 10 | 10 | 0 | | | | 2.484 | 10 |
| 10 | 9 | 5 | 36.69 | 2.447 | 7 | 2.448 | 10 |

TABLE 2-continued

| Indexing | | | ECR-18 | | | Paulingite | |
|---|---|---|---|---|---|---|---|
| h | k | l | 2θ | dÅ | I/Io | dÅ | I/Io |
| 13 | 8 | 3 | 39.97 | 2.254 | 5 | | |

TABLE 3

| Two Theta | dÅ | I/Io |
|---|---|---|
| 7.11 | 12.4 | 9 |
| 9.45 | 9.35 | 19 |
| 10.70 | 8.26 | 89 |
| 12.47 | 7.09 | 21 |
| 12.88 | 6.87 | 83 |
| 14.31 | 6.19 | 43 |
| 15.18 | 5.83 | 31 |
| 15.60 | 5.67 | 30 |
| 16.41 | 5.40 | 20 |
| 17.91 | 4.950 | 43 |
| 18.62 | 4.762 | 58 |
| 18.95 | 4.678 | 16 |
| 20.30 | 4.372 | 30 |
| 20.91 | 4.244 | 31 |
| 21.83 | 4.068 | 34 |
| 23.01 | 3.862 | 24 |
| 24.12 | 3.687 | 13 |
| 24.92 | 3.570 | 69 |
| 25.95 | 3.431 | 11 |
| 26.71 | 3.335 | 70 |
| 27.45 | 3.247 | 100 |
| 28.16 | 3.166 | 21 |
| 28.64 | 3.114 | 32 |
| 29.10 | 3.066 | 78 |
| 30.01 | 2.975 | 31 |
| 32.16 | 2.781 | 14 |
| 32.98 | 2.714 | 43 |
| 34.37 | 2.607 | 49 |
| 35.00 | 2.561 | 5 |
| 35.73 | 2.511 | 21 |
| 36.86 | 2.437 | 7 |
| 39.49 | 2.280 | 10 |

TABLE 4

| Two Theta | dÅ | I/Io |
|---|---|---|
| 9.40 | 9.40 | 15 |
| 10.67 | 8.29 | 69 |
| 11.20 | 7.89 | 8 |
| 12.84 | 6.89 | 77 |
| 14.23 | 6.22 | 22 |
| 15.13 | 5.85 | 23 |
| 15.54 | 5.70 | 21 |
| 16.36 | 5.42 | 12 |
| 17.84 | 4.967 | 44 |
| 18.55 | 4.780 | 49 |
| 18.84 | 4.706 | 13 |
| 20.23 | 4.387 | 32 |
| 20.62 | 4.304 | 8 |
| 20.85 | 4.257 | 30 |
| 21.76 | 4.080 | 28 |
| 22.40 | 3.967 | 10 |
| 22.91 | 3.878 | 9 |
| 24.04 | 3.700 | 9 |
| 24.84 | 3.582 | 93 |
| 25.93 | 3.434 | 19 |
| 26.62 | 3.346 | 75 |
| 27.36 | 3.257 | 86 |
| 28.07 | 3.176 | 11 |
| 28.54 | 3.125 | 38 |
| 28.98 | 3.078 | 100 |
| 29.93 | 2.983 | 69 |
| 30.63 | 2.917 | 11 |
| 32.05 | 2.791 | 10 |
| 32.87 | 2.723 | 54 |
| 34.25 | 2.616 | 76 |
| 34.83 | 2.574 | 21 |
| 35.63 | 2.518 | 8 |
| 36.74 | 2.444 | 16 |
| 38.86 | 2.315 | 6 |

I claim as my invention:

1. A synthetic ECR-18 zeolite, having a paulingite structure, at least three different charge balancing cations within the structure, and having an overall chemical composition:

$$a\ R_2O:\ b\ Na_2O:\ c\ (K,Rb,Ba_{0.5})_2O:\ Al_2O_3:\ 3\text{-}20\ SiO_2$$

where a = 0.04 to 0.20; b = 0.35 to 0.75; c = 0.10 to 0.60, R is TEA or ME3, and substantially the x-ray diffraction pattern shown in Table 1.

2. The synthetic zeolite of claim 1 wherein the overall chemical composition is:

$$0.9\ \text{to}\ 1.2\ (R, Na, K, Rb, Ba_{0.5})_2O:Al_2O_3:4\ \text{to}\ 10\ SiO_2$$

3. The synthetic zeolite of claim 2 wherein the void volume of the zeolite is greater than 0.40 cc/cc of zeolite.

4. A process for preparing the zeolite of claim 2 which comprises:
 (a) preparing a reaction mixture comprising an oxide of sodium, an oxide of potassium, rubidium and/or barium, water, a source of silica, a source of alumina, a tetraethyl and/or methyl triethyl ammonium ion source and, optionally, sodium aluminosilicate nucleating seeds or microcrystals of ECR-18 product, said reaction mixture having a composition, in terms of mole ratios of oxides, within the following ranges:

| | |
|---|---|
| $(Na, K, Rb, Ba_{0.5})_2:Al_2O_3$ | 0.3 to 3.0 |
| $R_2O:Al_2O_3$ | 0.8 to 3.5 |
| $SiO_2:Al_2O_3$ | 4 to 16 |
| $H_2O:Al_2O_3$ | 80 to 240 | and said seeds being present in an amount to yield 0.1 to 10 mole percent of the total final alumina content in said zeolite;
 (b) blending the reaction mixture sufficiently to form a substantially homogeneous mixture;
 (c) maintaining the reaction mixture at between about 80° C. and 220° C. under autogenous pressure for a sufficient period of time to form crystals of said zeolite; and
 (d) recovering said zeolite crystals.

5. The process of claim 4 wherein the zeolite has a composition, in terms of mole ratios of oxides, in the range:

$$0.9\ \text{to}\ 1.2\ (TEA,ME_3,Na,K,Rb,Ba_{0.5}):\ Al_2O_3:\ 4\ \text{to}\ 10\ SiO_2$$

6. The process of claim 4 wherein the source of silica is a colloidal silica and the sources of alumina are sodium and/or potassium aluminate and an aluminum salt selected from the group consisting of the chloride, sulfate and nitrate salts.

7. The process of claim 4 wherein the reaction mixture is maintained between 90° C. and 180° C.

8. The process of claim 4 wherein the reaction mixture is maintained between 90° C. and 120° C.

9. The process of claim 4 wherein the seeds are present in an amount to yield 1 to 20 mole percent of the total final alumina content.

10. The product of claim 5 wherein said template is ion exchanged with cations of elements of Group 1 through 8 of the Periodic Table.

11. Sorbent and separation products of claim 10.

12. Sorbent product of claim 10 useful for the purification of natural gas.

13. Sorbent product of claim 10 useful for the purification of impure hydrogen streams.

14. Sorbent product of claim 10 useful for the removal of sulfur containing molecules less than 4Å in diameter from hydrocarbon streams.

* * * * *